[11] 3,571,632

| | | | |
|---|---|---|---|
| [72] | Inventor | Martijn de Jong |  |
| | | Emmasingel, Eindhoven, Netherlands |  |
| [21] | Appl. No. | 687,065 |  |
| [22] | Filed | Nov. 30, 1967 |  |
| [45] | Patented | Mar. 23, 1971 |  |
| [73] | Assignee | U.S. Philips Corporation |  |
| | | New York, N.Y. |  |
| [32] | Priority | Dec. 17, 1966 |  |
| [33] | | Netherlands |  |
| [31] | | 6,617,756 |  |

[54] ELECTROMECHANICAL FILTER
7 Claims, 3 Drawing Figs.

[52] U.S. Cl. .................................................. 310/9.5,
310/9.6, 310/9.7, 333/72
[51] Int. Cl. ...................................................... H01v 7/00,
H03h 7/10
[50] Field of Search ........................................... 333/71, 72;
310/8, 9.5, 9.6, 9.7, 8.2

[56] References Cited
UNITED STATES PATENTS

| 2,830,274 | 4/1958 | Rosen et al. ................. | 333/72 |
|---|---|---|---|
| 2,943,279 | 6/1960 | Mattiat ........................... | 333/32 |
| 2,863,076 | 12/1958 | Koren et al. ................... | 333/72 |
| 2,875,355 | 2/1959 | Petermann .................... | 310/9.5 |
| 2,953,755 | 9/1960 | Mattiat ........................... | 333/72 |
| 3,018,451 | 1/1962 | Mattiat ........................... | 333/72 |
| 2,969,512 | 1/1961 | Jaffe .............................. | 333/72 |

*Primary Examiner*—Eli Lieberman
*Attorney*—Frank R. Trifari

ABSTRACT: An electromechanical filter comprises a disc or flat annular member of a polarized piezoelectric material, with an electrode on each face. The region of the member between the electrodes has remanent radial polarization. Thus, the polarization and the electric field are perpendicular to each other within the same volume.

PATENTED MAR23 1971 3,571,632
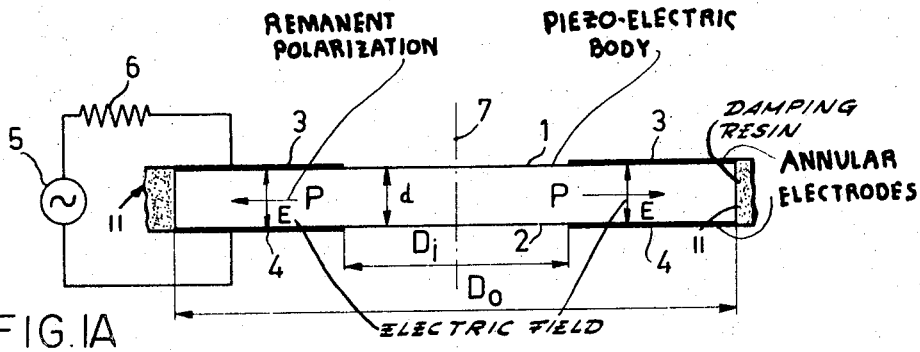
FIG.1A
FIG.1
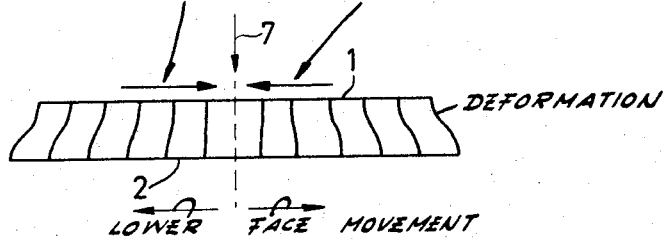
FIG.2
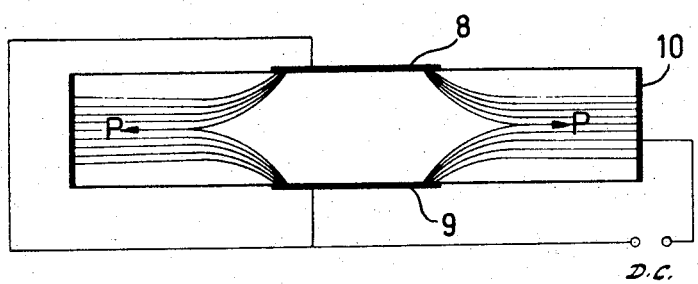
FIG.3A
FIG.3
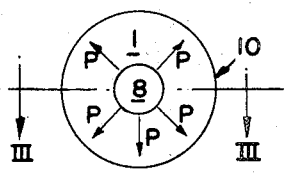
INVENTOR.
MARTIJN de JONG
BY
Frank R. Trifari
AGENT

ELECTROMECHANICAL FILTER

This invention relates to an electromechanical filter comprising a polarized piezoelectric body in the form of a flat, circular ring or disc the flat end faces of which are provided with signal electrodes. The filter body is usually excited in a mode of oscillation whereby either all points of one end face move with equal phase in the axial direction away from or towards those of the other end face (thickness vibrator) or all points of the cylindrical outer periphery move with equal phase away from or towards the axis (radial vibrator). In radial vibrators the lowest resonance frequency or fundamental frequency is determined in the first instance by the largest dimension, that is normally the diameter of the disc or the external and internal diameters of the ring. If a comparatively high frequency of the fundamental oscillation, for example 10 m.c.p.s. or upwards, is aimed at, radial vibrators generally are not particularly suitable for this purpose because of the small dimensions then required for the piezoelectric body.

For high fundamental frequencies use is therefore preferably made of thickness vibrators. In such a vibrator the body is excited in a mode the frequency of which corresponds to the (low) thickness of the body. However, this mode of oscillation is attended with many undesirable overtones; these are mechanical resonance frequencies of the piezoelectric body in the vicinity of the fundamental resonance which react on the electric impedance measured between the signal electrodes and hence give rise to an undesirable electric characteristic curve. In one particular embodiment of such an electromechanical filter, the piezoelectric body has the form of a flat circular disc the flat end faces of which are centrally provided with two circular signal electrodes while also the polarization of the material of the body between the said two electrodes is directed in the axial direction and hence at right angles to the said end faces. By applying a signal voltage to the signal electrodes, the body is excited at the signal electrodes in a thickness vibration which propagates further towards the edge of the body. At this edge the polarization has been chosen in the radial direction so that an electric output oscillation may be derived between one of the electrodes on the flat end faces and an electrode provided on the cylindrical periphery of the body, said radial polarization serving to obtain satisfactory conversion of the mechanical energy from the thickness vibration which propagates towards the edge, into electrical energy between the said output electrodes.

An object of the invention is to provide an electromechanical filter the piezoelectric body of which is excited in a mode which, for comparatively high values of the fundamental resonance frequency is attended with considerably fewer (undesirable) overtones of the mechanical oscillation than is the case with thickness vibrators. The invention is characterized in that the material of the body, at least between the signal electrodes, has remanent polarization in the radial direction. In contrast with the device described in the previous paragraph, which relates to a thickness vibrator, in this case a radially directed polarization between the signal electrodes is thus concerned, resulting in an entirely different mode of oscillation, namely one whereby the points of the two flat end faces vibrate in the radial direction but with opposite phases. In contrast with the radial vibrator previously described, the fundamental resonance frequency of which is determined in the first instance by the diameter of the disc or the diameters of the ring, in a device according to the invention the fundamental resonance is determined in the first instance by the thickness of the ring or disc, so that the filter is suitable for considerably higher frequencies. The disadvantages of thickness vibrators (which are also suitable for higher frequencies) with regard to the large number of overtones exist to a considerably lesser extent for the electromechanical filter according to the invention. Furthermore the device according to the invention especially lends itself to suppressing these satellites more or less by means of additional steps.

In order that the invention may be readily carried into effect it will now be described in detail, by way of example, with reference to the accompanying diagrammatic drawing, in which:

FIGS. 1 and 1A show one embodiment of the invention in cross section and top views, respectively;

FIG. 2 shows the vibration pattern (in exaggerated form) of the filter body of FIG. 1; and FIGS. 3 and 3A show in cross section and top views, respectively, an interim phase for obtaining a filter body as shown in FIG. 1.

FIG. 1 is a side view of a piezoelectric body in the form of a flat circular disc having flat circular upper and lower faces 1 and 2, respectively, which are provided with annular signal electrodes 3 and 4 respectively. The signal electrodes 3 and 4 are connected to a source of electrical oscillations 5 including an internal impedance 6, the electrical impedance measured between the electrodes 3 and 4 exhibiting resonances which correspond to the mechanical natural resonances of the piezoelectric body. This phenomenon may be utilized in known manner for filtering out (that is to say either passing or suppressing) frequencies from the signal source 5. The body may also be provided with additional electrodes on the flat end faces, in which event use is made of the phenomenon that the signal source 5 applied to the electrodes 3 and 4, produces, due to the electromechanical coupling, mechanical oscillations in the piezoelectric body which in turn give rise to an electric potential on the additional electrodes so as to obtain a transmission quadripole formed by the electrodes 3 and 4 (shown) and the said additional electrodes (not shown).

According to the invention a remanent polarization P prevails in the piezoelectric body at least between the signal electrodes 3 and 4. The polarization P is directed radially and, in the case shown, at any point of the piezoelectric body it is remote from the axis 7. As is well known, many titanates, zirconates, niobates and the like of, for example, alkaline-earth metals, for example barium titanate, barium-strontium titanate, lead-titanate zirconate, etc. have the property that, after a high electric voltage has been applied for some time, a remanent electrical polarization remains in the material which, in coaction with the field of an electric voltage set up at the signal electrodes, gives rise to mechanical deformations in the material which are based on the piezoelectric properties thereof. Since the electric alternating field in the electrodes 3 and 4 extends in parallel with the axis 7 of the piezoelectric body and hence is perpendicular to the polarization P, said body undergoes a deformation which is shown, in exaggerated form, for a given instant in FIG. 2.

In this FIG. the instant is chosen at which all points of the upper face 1 had moved towards the axis 7, but all points of the lower face 2 had just moved away from the axis 7. Consequently the points of the upper face 1 vibrate in the radial direction with equal phase, those of the face 2 likewise in the radial direction and with equal phase, but exactly in phase opposition relative to the points of the face 1. The fundamental frequency of the mechanical oscillation is thus determined in the first instance by the thickness $d$ of the piezoelectric body so that the filter is suitable for use at comparatively high frequencies, for example, a few m.c.p.s. In contrast with known thickness vibrators, however, the filter according to the invention is found to have considerably fewer overtones. According to a recognition which underlies the invention, this is attributable to the fact that a thickness vibration invariably also entails a radial vibration because of the Poisson contraction. This radial vibration propagates toward the cylindrical outer periphery of the body so that a large number of modes of oscillation dependent upon this external diameter, becomes possible and may even be accentuated if the (ceramic) material of the piezoelectric body exhibits irregularities, such as inhomogenities or occlusions of air. In a device according to the invention, the points of the body vibrate in the radial direction but the external diameter has only a very small influence on the resonance frequency and on the number of possible modes of oscillation, on the one hand because local irregularities can hardly interfere with the radial symmetry of the oscillation phenomenon and, on the other hand, because the vibrations at the upper and lower faces reach the cylindrical outer periphery with opposite phase, resulting in the elimination of a number of modes of oscillation which are possible for thickness vibrators.

Said overtones may furthermore be materially suppressed by using a few tricks. In the first place, by suitable choice of the thickness of the electrodes 3 and 4 fundamental resonance may be accentuated at the expense of all further inharmonics of the piezoelectric body. To this end it is also possible to provide the piezoelectric body. To this end it is also possible to provide the piezoelectric body with a plurality of concentric annular electrodes. In a piezoelectric body of lead-titanate zirconate of approximately $120/\mu$ thick, this effect was found to be produced, for example, with vapour-deposited gold electrodes 3 and 4 of less than $1/\mu$ thick. The value of the external diameter $D_o$ (for example 6 mms.) was found to have little influence on the fundamental frequency of the overtones. Grinding the external diameter down to 5 mms. resulted in an increase in fundamental frequency of only 1 percent. This grinding down treatment may be useful for trimming purposes.

Further, by suitable choice of the internal diameter $D_i$ of the electrodes 3 and/or 4 it may be achieved that the most troublesome overtones is still materially suppressed. To this end, the value preferably chosen for $D_i$ preferably lies between 0.3 and 0.5 times the external diameter $D_o$, in which event the inner harmonic located nearest to the fundamental frequency may be suppressed. In FIG. 1, the indication $D_i$ refers to the internal diameter of the two disc-shaped signal electrodes 3 and 4. This can be readily seen in FIG. 1A. However, it is to be noted that it is immaterial whether one or both signal electrodes 3 and 4 fulfill the condition imposed, since the electric alternating field in practice does not extend beyond the region between the two signal electrodes. If desired (for example, for the above-mentioned accentuation of the fundamental oscillation at the expense of the overtones by suitable choice of the thickness of the electrodes 3 and 4) the electrodes 3 and 4 could cover the entire surfaces 1 and 2, respectively, while ensuring on the other hand that no radial polarization prevails in the piezoelectric body inside a cylinder of a diameter $D_i$. In this case the central portion of the piezoelectric body does not participate in the electromechanical conversion and it would thus be possible, if desired, to use an annular piezoelectric body. By grinding down the internal diameter of such a ring, it would be possible to increase the fundamental resonance, for example, for trimming purposes.

It is further possible, if desired, to take further usual steps for suppressing undesirable overtones. Thus, it is known, for example, to provide acoustically damping material, for example, an epoxy resin, at suitable areas on a vibrator body. In the case under consideration, damping material 11 in FIG. 1 may be provided, for example, on the outer cylindrical periphery of the piezoelectric body.

To obtain the desired radial polarization it is naturally possible to use an annular piezoelectric body in which the relevant strong electric field is set up for the prescribed period between the inner and outer cylindrical peripheries. It is also possible to proceed as follows: Starting from a piezoelectric body which is considerably thicker than ultimately desired, such as shown in FIGS. 3 and 3A, this body is provided with two circular electrodes 8 and 9 on its flat end faces and with a cylindrical electrode 10 on its cylindrical outer periphery. The polarization P can now be obtained by electrically connecting the electrodes 8 and 9 together and setting up at the electrode 10 a high voltage relative to the interconnected electrodes 8 and 9. Subsequently the upper and lower faces may be ground down to the thickness desired so as to obtain the required more or less homogenous radial polarization P in the desired portion of the body.

I claim:

1. An electromechanical filter, comprising a flat circular piezoelectric member with a volume having opposing surfaces and a residual polarization in a radial direction substantially parallel to said surfaces, and a pair of planar electrodes coupled to said opposing surfaces respectively and at least partially enclosing said polarized volume thereby to produce an electric field perpendicular to the polarization of the volume of said member contained between said electrodes.

2. The filter of claim 1 wherein the internal diameter where the residual radial polarization begins is between 0.3 and 0.5 times the external diameter of said member.

3. A filter as claimed in claim 1 wherein said electrodes each comprise a circular disc having a central hole concentric with said member disc.

4. A filter as claimed in claim 3 wherein the diameter of at least one electrode hole is 0.3 to 0.5 times the external diameter of said disc electrode.

5. A filter as claimed in claim 1 wherein the thickness of said electrodes is chosen to maximize the ratio of the fundamental to overtone energy.

6. A filter as claimed in claim 1 wherein said member comprises a material selected from the group consisting of barium titanate, barium-strontium titanate, or lead-titanate zirconate.

7. A filter as claimed in claim 1 further comprising damping material disposed partially about said member to suppress unwanted overtones.